(12) United States Patent
Lin

(10) Patent No.: US 12,022,973 B2
(45) Date of Patent: Jul. 2, 2024

(54) TEA BREWING DEVICE UTILIZING MAGNETIC MECHANISM

(71) Applicant: Yisheng Lin, Guangdong (CN)

(72) Inventor: Yisheng Lin, Guangdong (CN)

( * ) Notice: Subject to any disclaimer, the term of this patent is extended or adjusted under 35 U.S.C. 154(b) by 636 days.

(21) Appl. No.: 17/327,803

(22) Filed: May 24, 2021

(65) Prior Publication Data

US 2022/0369848 A1 Nov. 24, 2022

(51) Int. Cl.
*A47J 31/06* (2006.01)
*A47J 31/44* (2006.01)

(52) U.S. Cl.
CPC ....... *A47J 31/0642* (2013.01); *A47J 31/0615* (2013.01); *A47J 31/4407* (2013.01)

(58) Field of Classification Search
CPC . A47J 31/0642; A47J 31/0615; A47J 31/4407
USPC .......................................................... 99/295
See application file for complete search history.

(56) References Cited

U.S. PATENT DOCUMENTS

| | | | | |
|---|---|---|---|---|
| 2010/0018403 A1* | 1/2010 | Hoare | ...................... | A47J 31/20 99/323 |
| 2016/0113433 A1* | 4/2016 | Hsu | ...................... | A47J 31/0615 99/283 |
| 2019/0290048 A1* | 9/2019 | Albanese | ............... | A47J 31/521 |
| 2020/0154930 A1* | 5/2020 | Rivera | ................. | A47J 31/4457 |
| 2020/0329898 A1* | 10/2020 | Han | .......................... | A23N 1/02 |
| 2021/0330115 A1* | 10/2021 | Yang | ........................ | A47J 31/20 |
| 2022/0087469 A1* | 3/2022 | Huang | ................ | A47J 31/0615 |
| 2022/0095826 A1* | 3/2022 | Li | ........................ | A47J 31/4457 |
| 2022/0369848 A1* | 11/2022 | Lin | ..................... | A47J 31/4407 |

FOREIGN PATENT DOCUMENTS

| EP | 3569114 A1 * | 11/2019 | .......... A47J 31/0615 |
|---|---|---|---|
| WO | WO-2017106201 A1 * | 6/2017 | ............... A45F 3/20 |

* cited by examiner

*Primary Examiner* — Omar Flores Sanchez

(57) ABSTRACT

A tea brewing device, having a cup body, a tea leaf chamber, and a top cover connected with the cup body; a tea leaf chamber separation mechanism is provided at the top cover, containing a sliding block and a separation magnet protruding out of a bottom side of the sliding block; the sliding block changes its position relative to the top cover by sliding; the tea leaf chamber is disposed inside with a sealed magnetic metal; the tea leaf chamber is attracted to a bottom side of the top cover via magnetic attraction between the separation magnet and the magnetic metal; the sliding block is driven to slide so that the separation magnet is moved away from the magnetic metal, and the magnetic attraction between the two becomes weaker than a gravitational force of the tea leaf chamber, which then drops down to the cup body, thereby beginning tea brewing.

15 Claims, 15 Drawing Sheets

TEA BREWING DEVICE UTILIZING MAGNETIC MECHANISM

BACKGROUND OF THE INVENTION

The present invention relates to the technical field of brewing tea, and more specifically relates to a tea brewing device utilizing magnetic mechanism.

Due to continuous social developments, more and more people are fond of the art of brewing tea. Drinking tea is good for the general wellness and quality of life. However, consumers may have different preferences for the strength of tea. Traditional tea cups cannot satisfy the need for adjusting the strength of tea. Most of the tea cups now available in the market allow a filter bag to be simply put inside the tea cup, and tea leaves are placed inside the filter bag. As such, strength of tea cannot be conveniently adjusted according to consumer's need.

CN204698258U discloses a multifunctional bottle for brewing tea, comprising a bottle body and a top cover. A tea leaf chamber is disposed inside the bottle body and movable inside the bottle body. The top cover comprises a cylindrical cover body. An intermediate separation seat is provided inside the cover body. A magnetic mechanism is provided between the intermediate separation seat and the tea leaf chamber to allow mutual attraction of the intermediate separation seat and the tea leaf chamber. A tea leaf chamber ejection mechanism is mounted at the intermediate separation seat. The tea leaf chamber filled with tea leaves is placed inside the bottle body, and water is poured into the bottle body. The top cover and the bottle body are connected. After turning the bottle body up-side down and then turning it back to its normal upright position, the tea leaf chamber will be attracted to a bottom side of the intermediate separation seat via the magnetic mechanism, and thus leaving the water. When there is a need to brew tea, press the tea leaf chamber ejection mechanism and release the tea leaf chamber such that the tea leaf chamber drops into the water inside the bottle body. Although the disclosed prior art patent can adjust the strength of tea, the metallic tea leaf chamber may develop rust easily during the process of use. Also, the magnetic mechanism and the tea leaf chamber ejection mechanism disposed simultaneously at the top cover render the top cover structurally complicated, and such structural complication may also associate with the problem of sealing a push rod. In spite of using a resilient sealing cap, the use of such still increases manufacturing difficulty and production costs, thereby increasing the overall manufacturing costs which hinder the product from being promoted in the market.

BRIEF SUMMARY OF THE INVENTION

An object of the present invention is to provide a tea brewing device utilizing magnetic mechanism for use with a tea cup or other tea brewing devices. The present invention given herein should be simple in structure, easy to use, stable and reliable, and which can adjust the strength of tea.

To solve the above technical problems, the present invention provides the following technical solutions:

A tea brewing device, comprising a cup body, a tea leaf chamber, and a top cover which is sealably connected with the cup body; the tea leaf chamber is disposed inside the cup body during use; wherein, a tea leaf chamber separation mechanism is provided at a center of the top cover; the tea leaf chamber separation mechanism comprises a sliding block and a separation magnet; the separation magnet is disposed at a bottom side of the sliding block and protrudes out of the bottom side of the sliding block; sliding of the sliding block changes a position of the sliding block relative to the top cover; a center of an interior of the tea leaf chamber is disposed with a sealed magnetic metal; the tea leaf chamber is attracted to a center of a bottom side of the top cover via magnetic attraction between the separation magnet and the magnetic metal; to brew tea, the sliding block is driven to slide such that the separation magnet is moved away from the magnetic metal, so that the magnetic attraction between the separation magnet and the magnetic metal is reduced such that the magnetic attraction is weaker than a gravitational force of the tea leaf chamber, resulting in the tea leaf chamber dropping down to an inner bottom side of the cup body due to gravitational force and thus separated from the top cover, thereby beginning tea brewing; to stop tea brewing, the cup body is turned up-side down so that the tea leaf chamber moves towards the top cover due to gravitational force, and thus the tea leaf chamber is attracted to the bottom side of the top cover due to magnetic attraction between the separation magnet and the magnetic metal; when the cup body is again turned back to an original upright position, the tea leaf chamber is attracted to the bottom side of the top cover, thereby separating the tea leaf chamber from the brewed tea.

Further, a sliding groove receiving the sliding block and allowing the sliding block to slide therein is provided radially on the top cover; a bottom side of the sliding groove is recessed to define a separation groove where the separation magnet is slidable therein; one end of the separation groove is positioned at a center of the bottom side of the sliding groove.

Further, the sliding block is an assembly of more than one component; wherein the sliding block is divided by an upward slanted cut in a middle part of the sliding block such that the sliding block is divided into a press portion and a sliding portion; the press portion and the sliding portion slide mutually with respect to each other via a first sliding slanted surface of the press portion along the slanted cut and a second sliding slanted surface of the sliding portion along the slanted cut; the separation magnet is disposed on a bottom side of the sliding portion and protrudes out of the bottom side of the sliding portion; the top cover is axially provided with a guiding groove that receives the press portion and inside which the press portion is capable of moving vertically by pressing the press portion; a bottom part of the guiding groove is recessed downwardly away from a center point of the top cover to sequentially define a sliding trough that allows the sliding portion to slide therein and a separation groove that allows the separation magnet to slide therein; one end of the separation groove is positioned at a center of a bottom of the guiding groove.

Further, an upper side surface of the sliding block is provided with a push button; a periphery of the upper side surface of the sliding block is defined as a first sliding periphery slidably in contact with top end surfaces of the sliding groove; a periphery of the bottom side of the sliding block is defined as a second sliding periphery slidably in contact with the bottom side of the sliding groove; one end of the bottom side of the sliding block is provided with a stepped hole wherein the separation magnet is mounted; a center point of the stepped hole coincides with a center point of the top cover.

Further, the guiding groove has a semi-circular shape; the guiding groove is opened with a first slot, a second slot and a third slot equally spaced along the semi-circular shape of the guiding groove.

Further, the tea leaf chamber separation mechanism also comprises a spring and a tea leaf chamber separation mechanism upper cover; one end of the spring is connected to a front end of the sliding block along a sliding direction of the sliding block, and another end of the spring is connected to one end of the sliding groove; also, the spring is positioned above the separation groove; an annular opening is provided at a middle part of the tea leaf chamber separation mechanism upper cover of the tea leaf chamber separation mechanism extending towards a periphery of the tea leaf chamber separation mechanism upper cover; an upper end of the push button passes through the annular opening; through holes are provided around a peripheral area of a top surface of the tea leaf chamber separation mechanism upper cover; the tea leaf chamber separation mechanism upper cover fixedly covers the top cover.

Further, a side surface of a lower part of the press portion is provided with a first guiding piece, a second guiding piece and a third guiding piece that are capable of slidably engaging with the first slot, the second slot and the third slot respectively.

Further, fixation holes are provided around a peripheral area of a top surface of the top cover; the fixation holes correspond to the through holes such that each fixation hole and a corresponding through hole is adapted to be passed through by a screw to fix the tea leaf chamber separation mechanism upper cover onto the top cover, and to slidably assemble the sliding block to the top cover.

Further, a lower part of the sliding portion is also provided with a third sliding periphery that is in slidable contact with the sliding trough; a bottom side of the sliding portion is provided with a stepped hole in which the separation magnet is mounted; a center point of the stepped hole coincides with a center point of the top cover.

Further, the peripheral area of the top surface of the tea leaf chamber separation mechanism upper cover where the through holes are positioned is also recessed to form an annular groove; a plastic ring adapted to seal the screws is disposed in the annular groove; a bottom side of the first sliding periphery and a bottom side of the second sliding periphery are each provided with semi-spherical protrusions.

Further, a bottom side of the third sliding periphery and a bottom end surface of the stepped hole are each provided with multiple semi-spherical protrusions.

Further, semi-spherical protrusions are also provided on the second sliding slanted surface of the sliding portion along the slanted cut; one end of the spring is connected to a front end of the sliding portion along a sliding direction of the sliding portion; and another end of the spring is connected to one end of the sliding trough.

Further, the tea leaf chamber comprises a tea leaf chamber upper cover and a chamber body; the tea leaf chamber upper cover covers the chamber body; a cavity that holds tea leaves and a mounting hole that mounts the magnetic metal are provided inside the chamber body; the mounting hole is positioned at a center of the cavity; the tea leaf chamber upper cover and the chamber body are both provided with meshes to ensure sufficient contact between water and the tea leaves during tea brewing.

Further, the magnetic metal is an iron, and the separation magnet is a neodymium magnet.

Further, the top cover is threadedly connected to the cup body; the bottom side of the top cover is provided with a seal ring to achieve sealing between the top cover and the cup body.

Further, a bottom part of the cup body is sleeved with a silicon sleeve; an annular gas discharging port is provided on a side wall of the silicon sleeve.

The present invention has the following beneficial effects:

The top cover can hold the tea leaf chamber by magnetic attraction or release the tea leaf chamber via the tea leaf chamber separation mechanism disposed on the top cover by making use of magnetic mechanism according to which the magnetic metal or an iron is magnetically attracted by a magnet. When it is required to brew tea, the separation magnet is driven away from the magnetic metal by driving the sliding block to slide or pressing the press portion. When the magnetic force between the separation magnet and the magnetic metal is reduced to be weaker than the gravitational force of the tea leaf chamber, the tea leaf chamber will drop to the inner bottom of the cup body due to gravitational force, and start tea brewing. When tea brewing is not required, turn the cup body up-side down such that the tea leaf chamber will move towards the top cover due to gravitational force, and thus the tea leaf chamber will be attracted to the bottom side of the top cover due to magnetic attraction between the separation magnet and the magnetic metal, then turn the cup body back to the original upright position, the tea leaf chamber is still attracted to the bottom side of the top cover, thereby separating the tea leaf chamber from the brewed tea. As such, the present invention achieves the function of adjusting the strength of tea. The present invention is simple in structure, convenient to use, stable and reliable, and can adjust the strength of tea. Hence, the present invention overcomes the technical problem of adjusting the strength of tea as in the prior art. The present invention can also be widely applied to other devices that also require adjustment of liquid concentration. Accordingly, the present invention has a good marketing value.

REFERENCES IN THE FIGURES

| No. | Component represented | No. | Component represented |
|---|---|---|---|
| 1 | Cup body | 231 | Cavity |
| 2 | Tea leaf chamber | 361 | First slot |
| 3 | Top cover | 362 | Second slot |
| 4 | Tea leaf chamber separation mechanism | 363 | Third slot |
| | | 411 | Push button |
| 11 | Silicon sleeve | 412 | First sliding periphery |
| 21 | Magnetic metal | 413 | Second sliding periphery |
| 22 | Tea leaf chamber upper cover | 414 | Stepped hole |
| 23 | Chamber body | 415 | Semi-spherical protrusions |
| 31 | Sliding groove | 441 | Annular opening |
| 32 | Separation groove | 442 | Through holes |
| 33 | Fixation hole | 443 | Annular groove |
| 34 | Seal ring | 444 | Plastic ring |
| 35 | Annular flange | 416 | Press portion |
| 36 | Guiding groove | 417 | Sliding portion |
| 37 | Sliding trough | 4161 | First sliding slanted surface |
| 41 | Sliding block | 4162 | First guiding piece |
| 42 | Separation magnet | 4163 | Second guiding piece |
| 43 | Spring | 4164 | Third guiding piece |
| 44 | tea leaf chamber separation mechanism upper cover | 4171 | Second sliding slanted surface |
| | | 4172 | Third sliding periphery |
| 111 | Annular gas discharging port | | |
| 221 | Mounting hole | | |
| 222 | Annular recessed portion | | |

DETAILED DESCRIPTION OF THE INVENTION

The present invention is further described in detail below with reference to some embodiments and the accompanying drawings.

Embodiment 1

Figure 1:
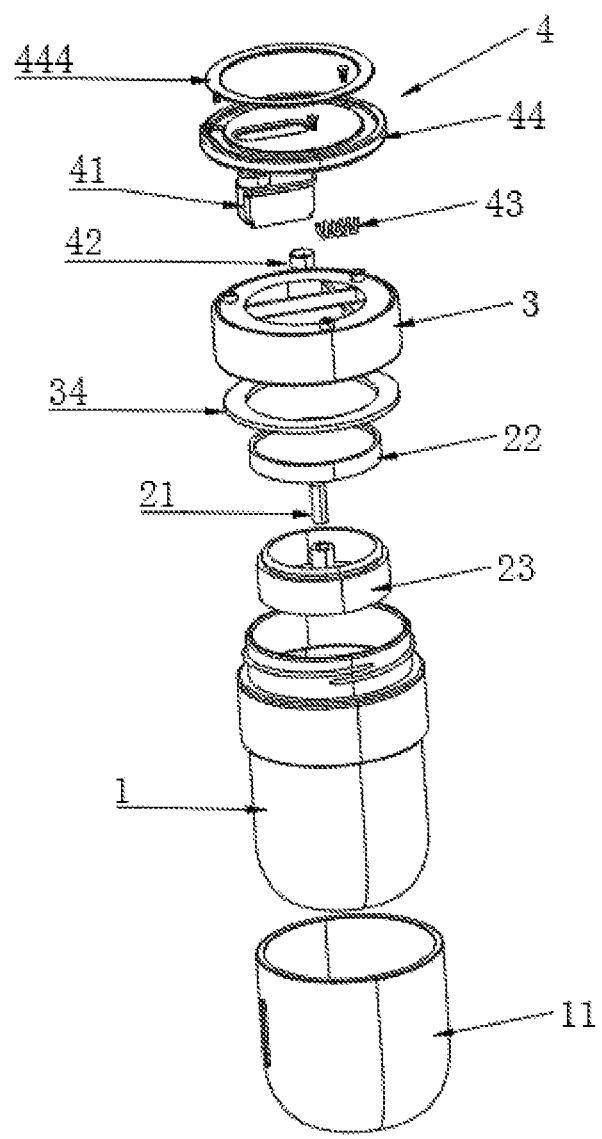
FIG. 1 is an exploded structural view showing the overall structure of the tea brewing device according embodiment 1 of the present invention.
Figure 2:
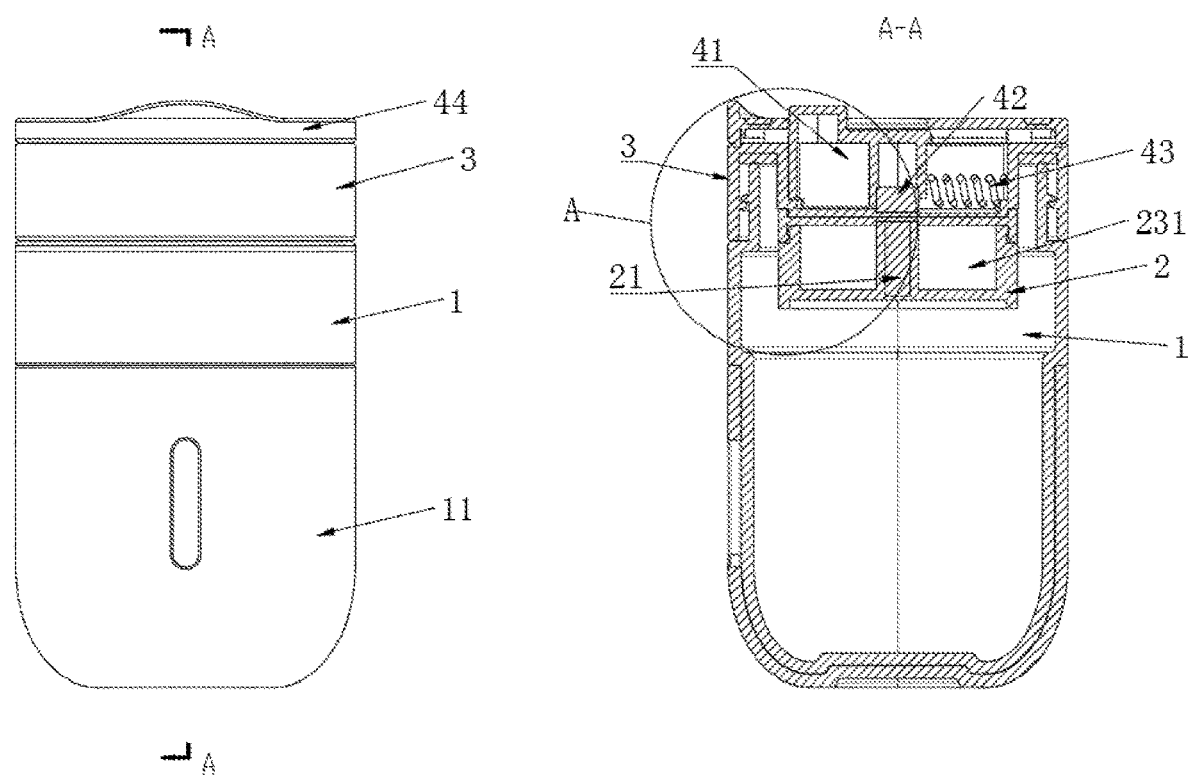
FIG. 2 is a sectional structural view showing the overall structure of the tea brewing device according embodiment 1 of the present invention.
Figure 3:
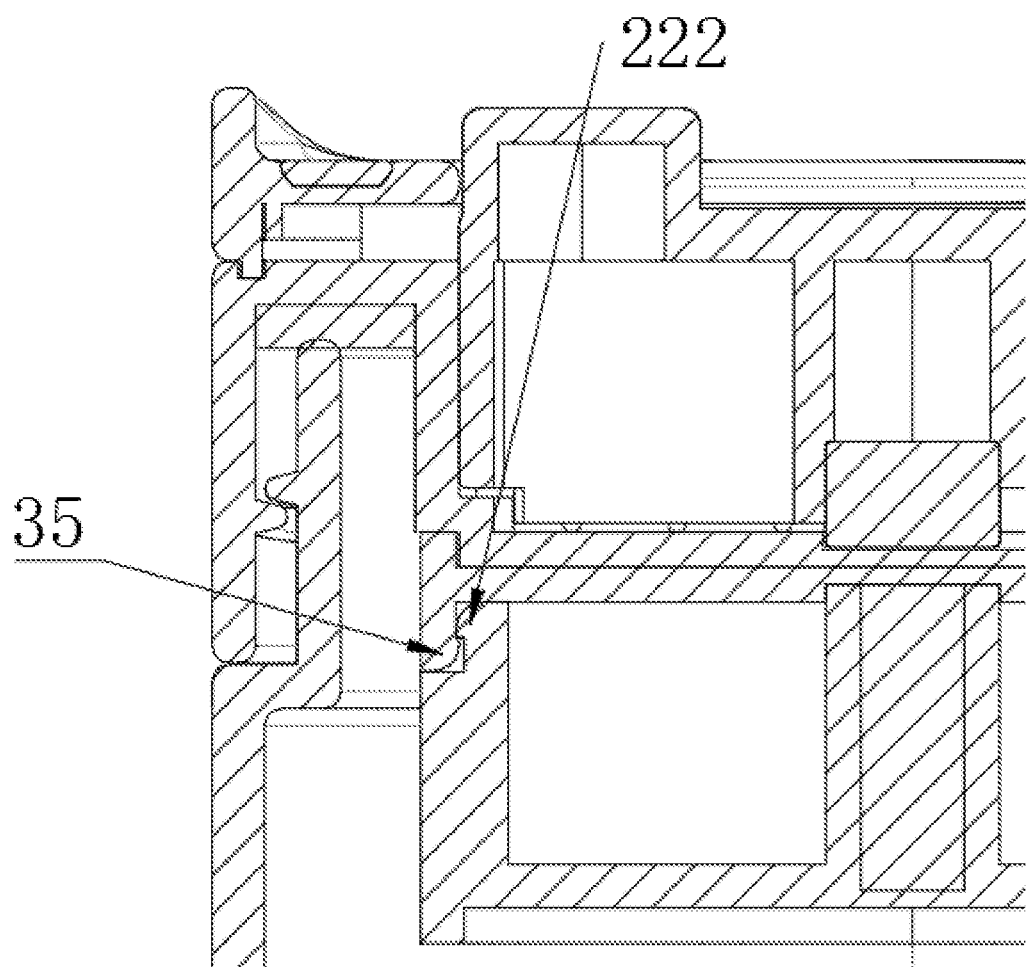
FIG. 3 is the enlarged portion A shown in FIG. 2.
Figure 4:
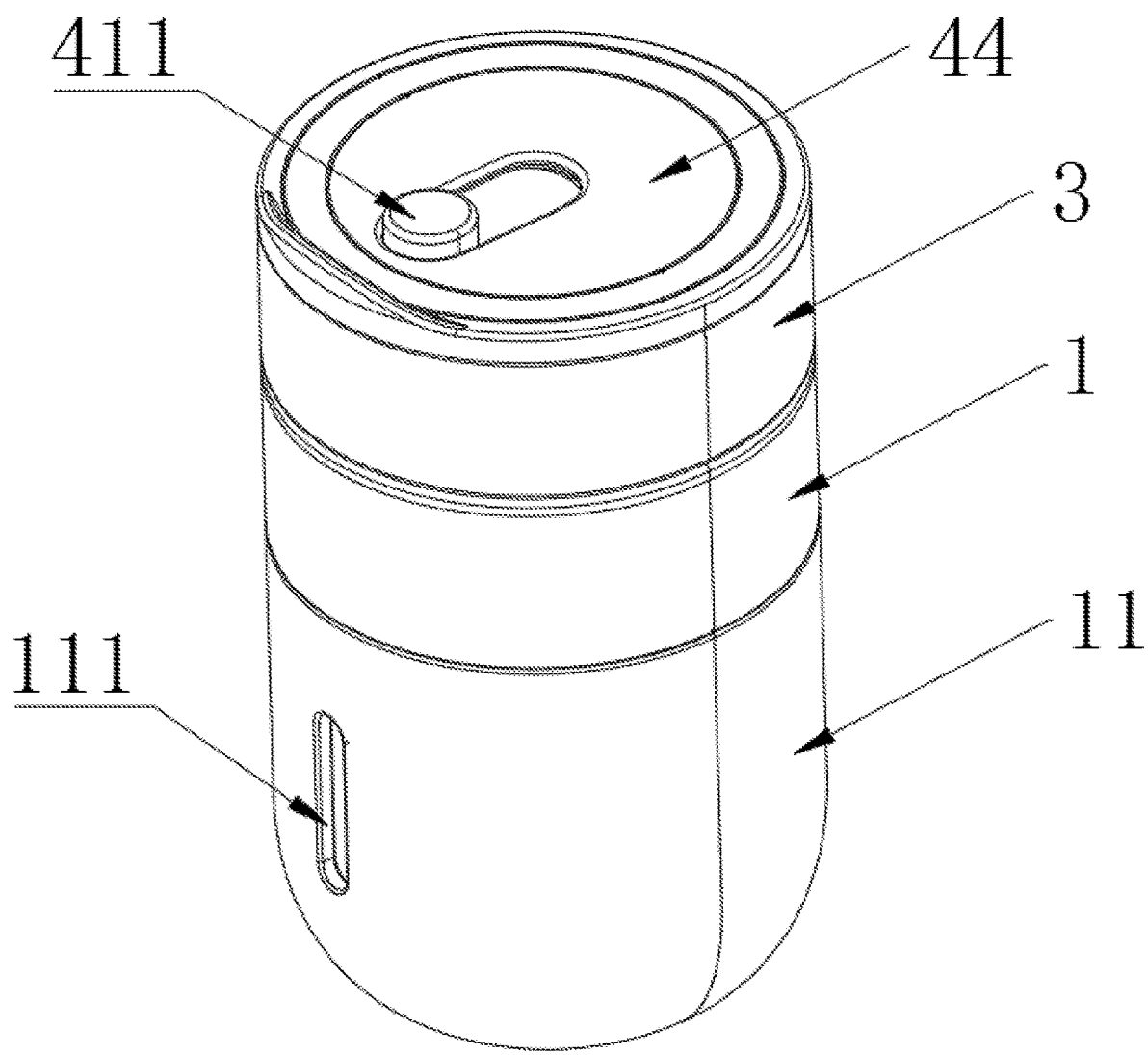
FIG. 4 is the overall structural view of the tea brewing device according to embodiment 1 of the present invention.
Figure 5:
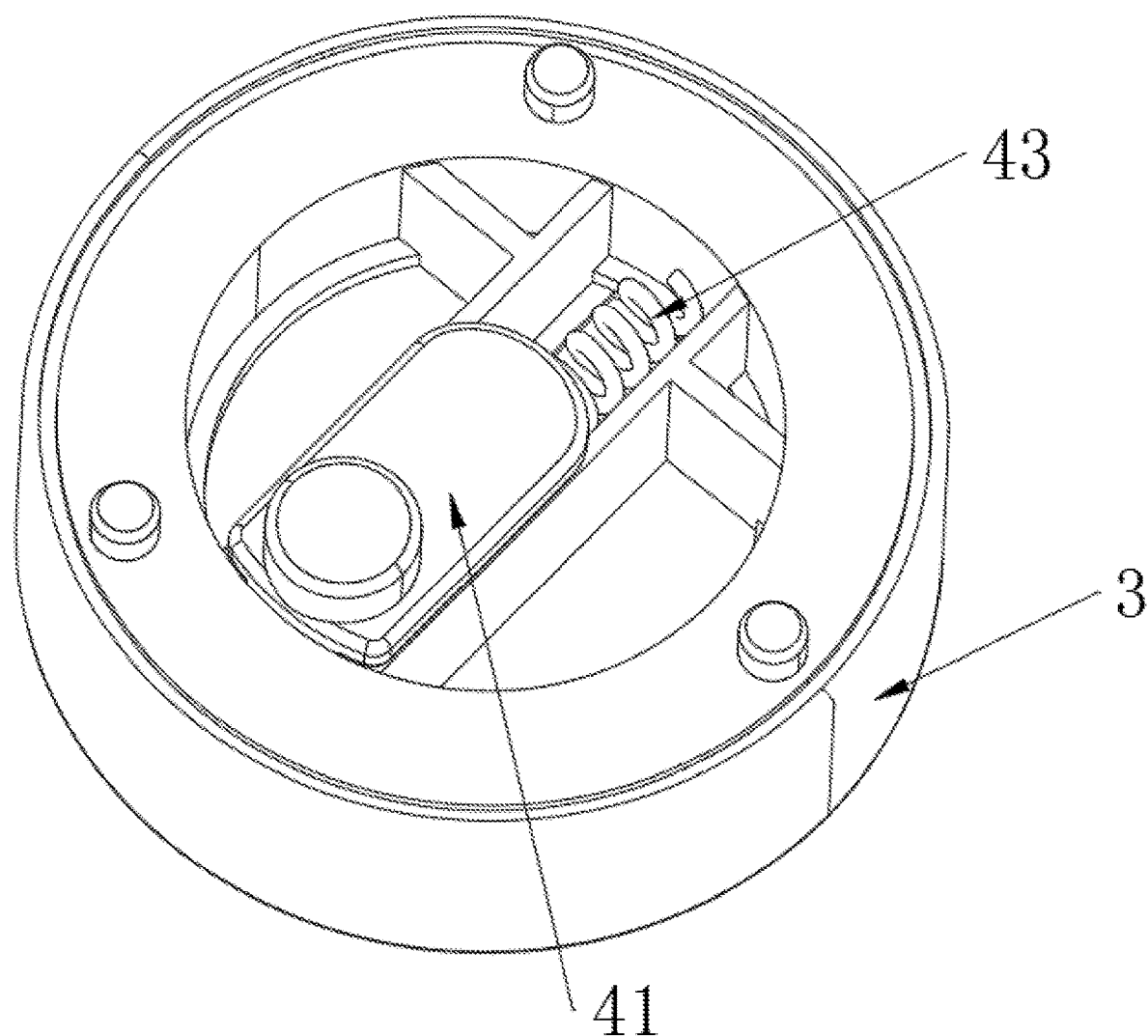
FIG. 5 is the assembled view of the top cover and the tea leaf chamber separation mechanism of the tea brewing device according to embodiment 1 of the present invention.
Figure 6:
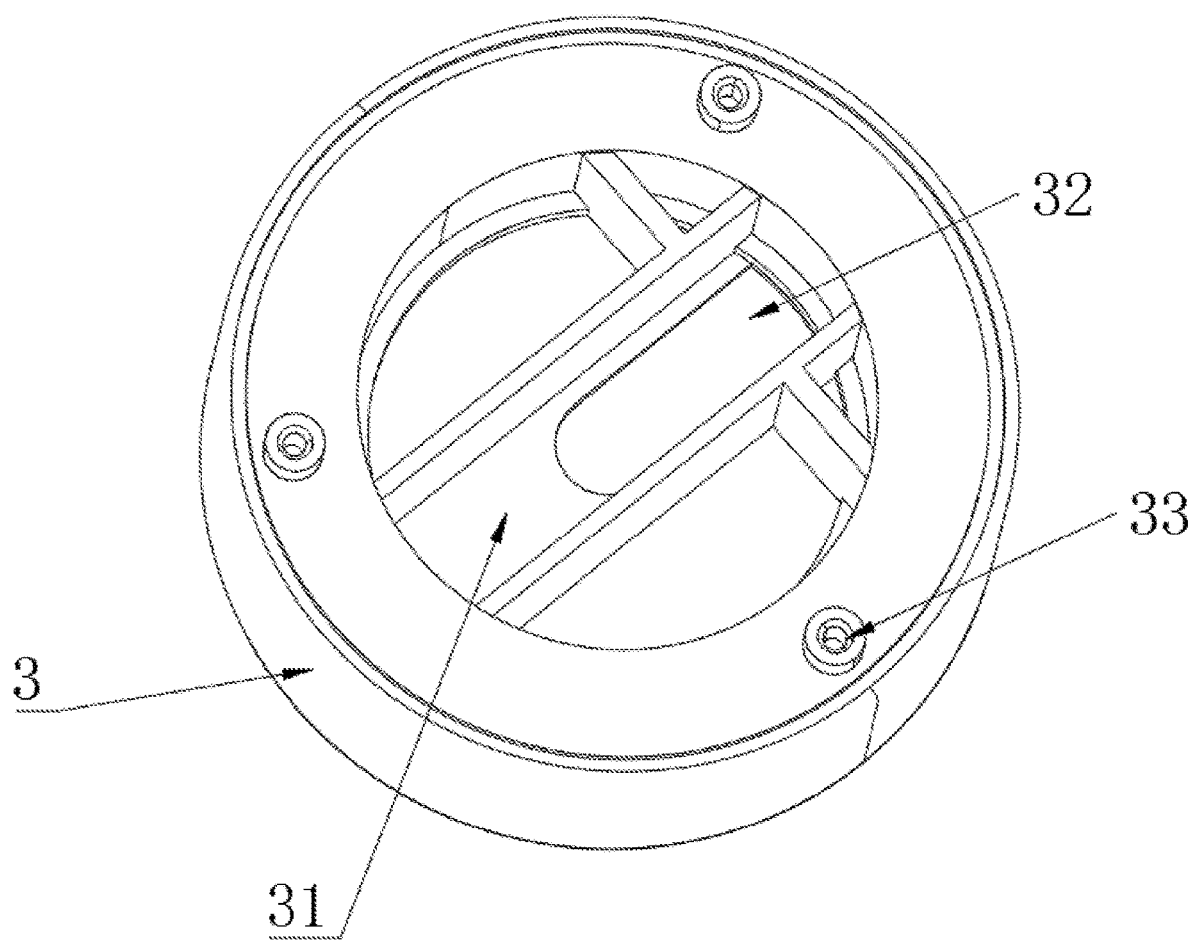
FIG. 6 is the structural view of the top cover of the tea brewing device according to embodiment 1 of the present invention.
Figure 7:
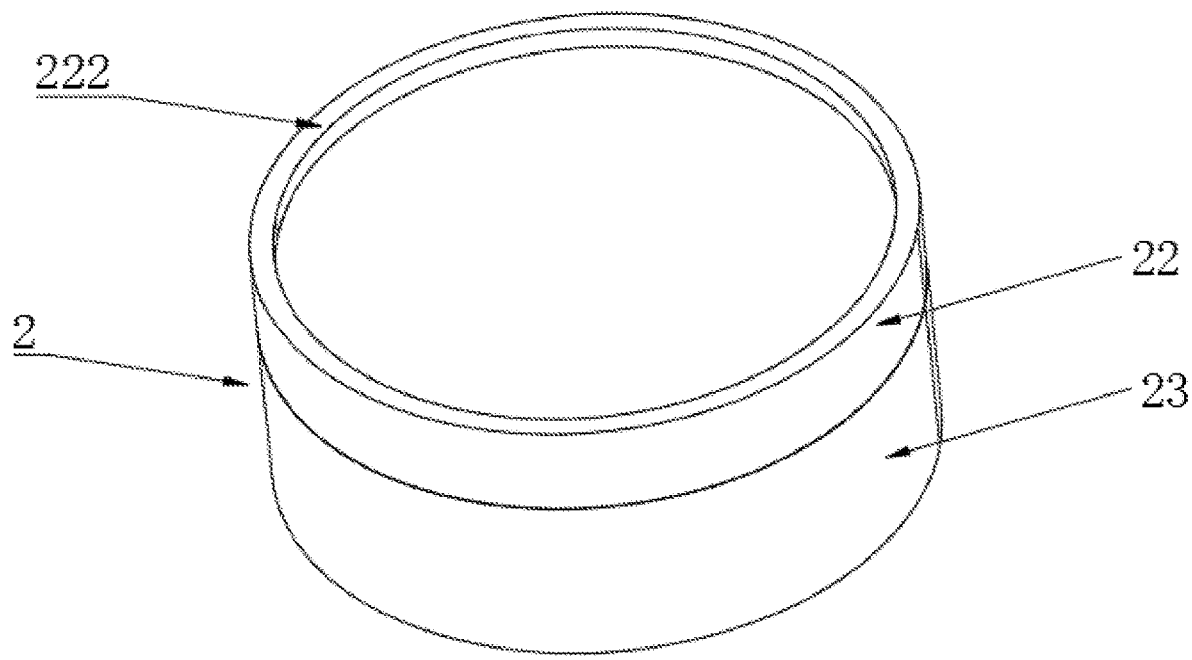
FIG. 7 is the overall structural view of the tea leaf chamber of the tea brewing device according to embodiment 1 of the present invention.
Figure 8:
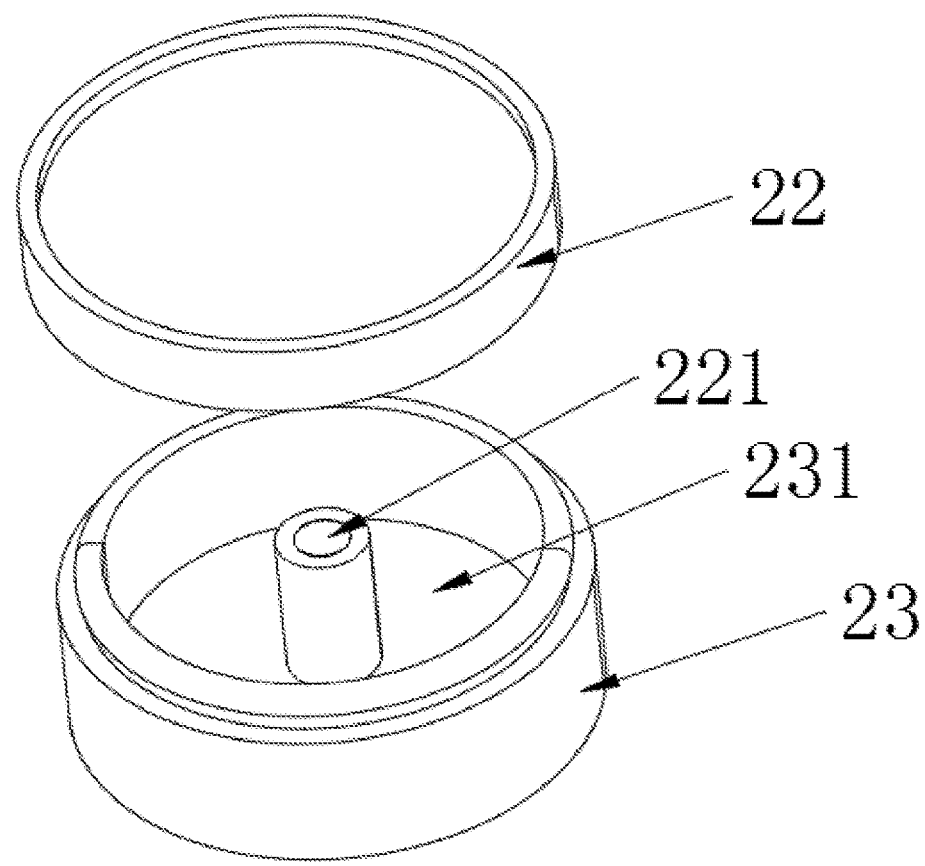
FIG. 8 is an exploded view of the tea leaf chamber of the tea brewing device according to embodiment 1 of the present invention.
Figure 9:
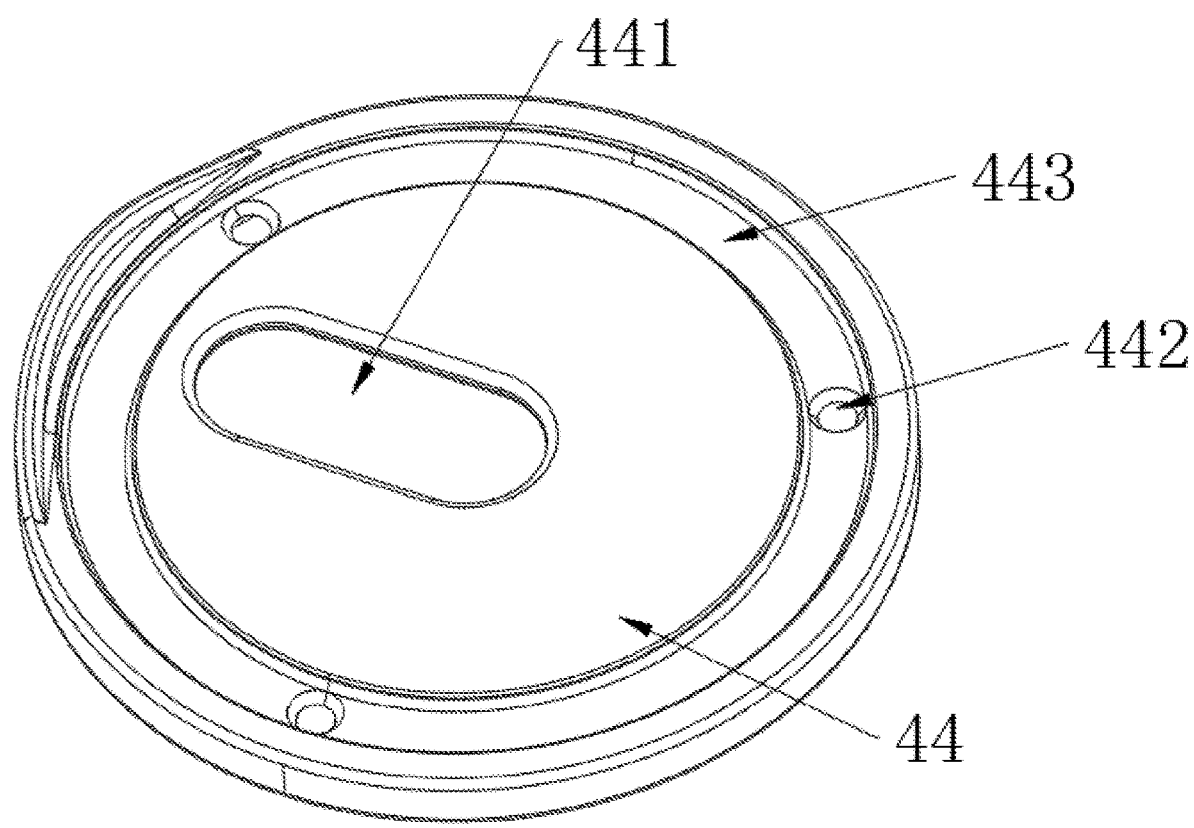
FIG. 9 is a structural view of the tea leaf chamber separation mechanism upper cover of the tea brewing device according to embodiment 1 of the present invention.
Figure 10:
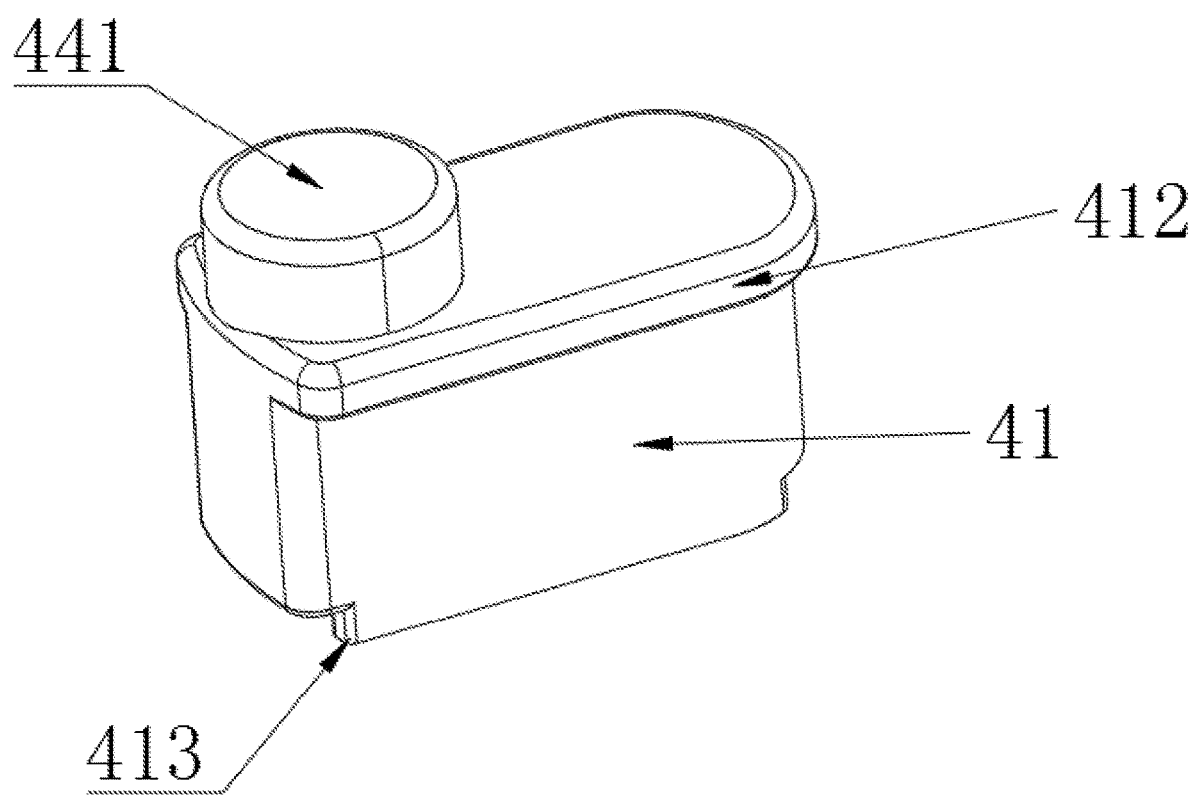
FIG. 10 is the structural view of the sliding block of the tea brewing device according to embodiment 1 of the present invention.
Figure 11:
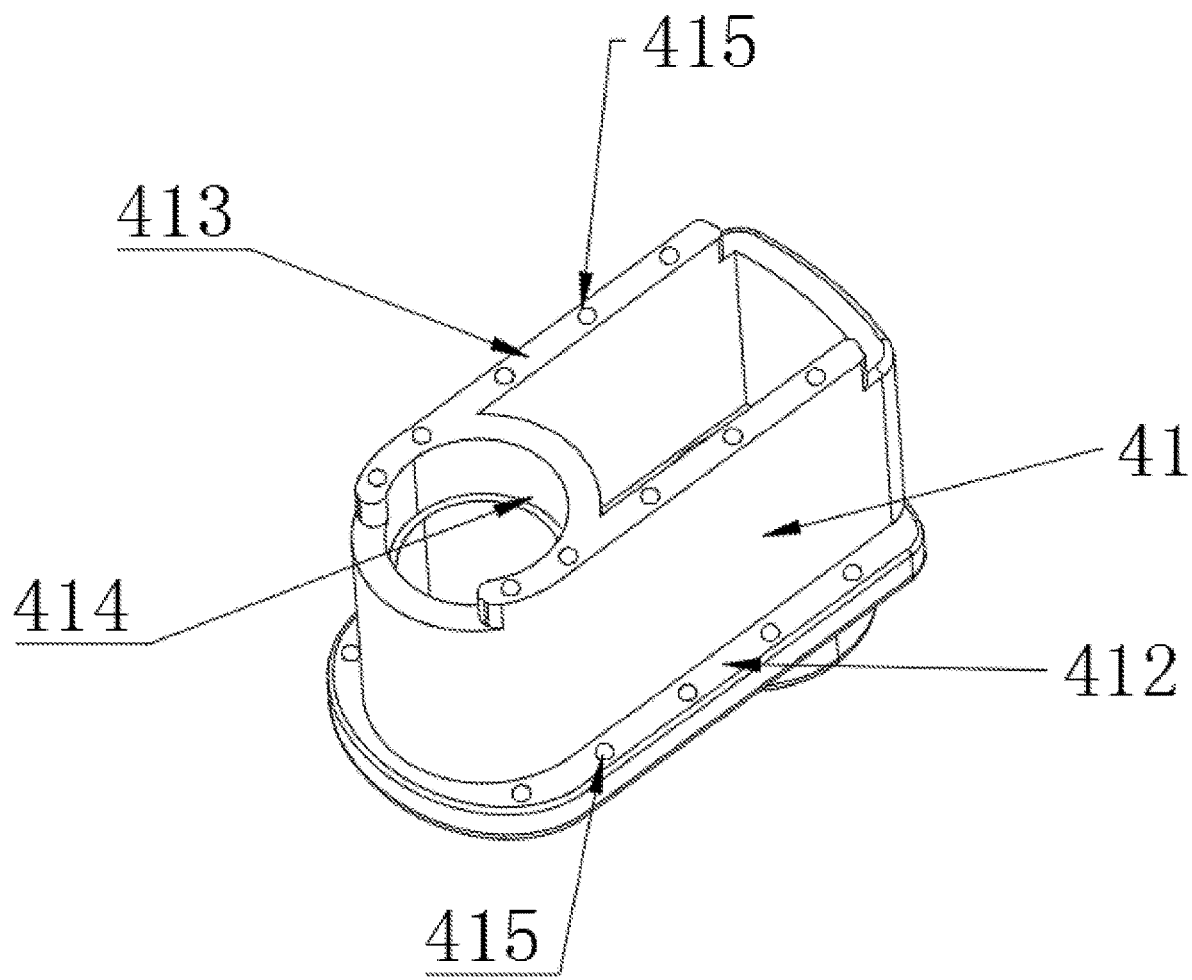
FIG. 11 is another structural view of the sliding block of the tea brewing device according to embodiment 1 of the present invention, where a bottom side of the sliding block is shown facing upwardly.
Figure 12:
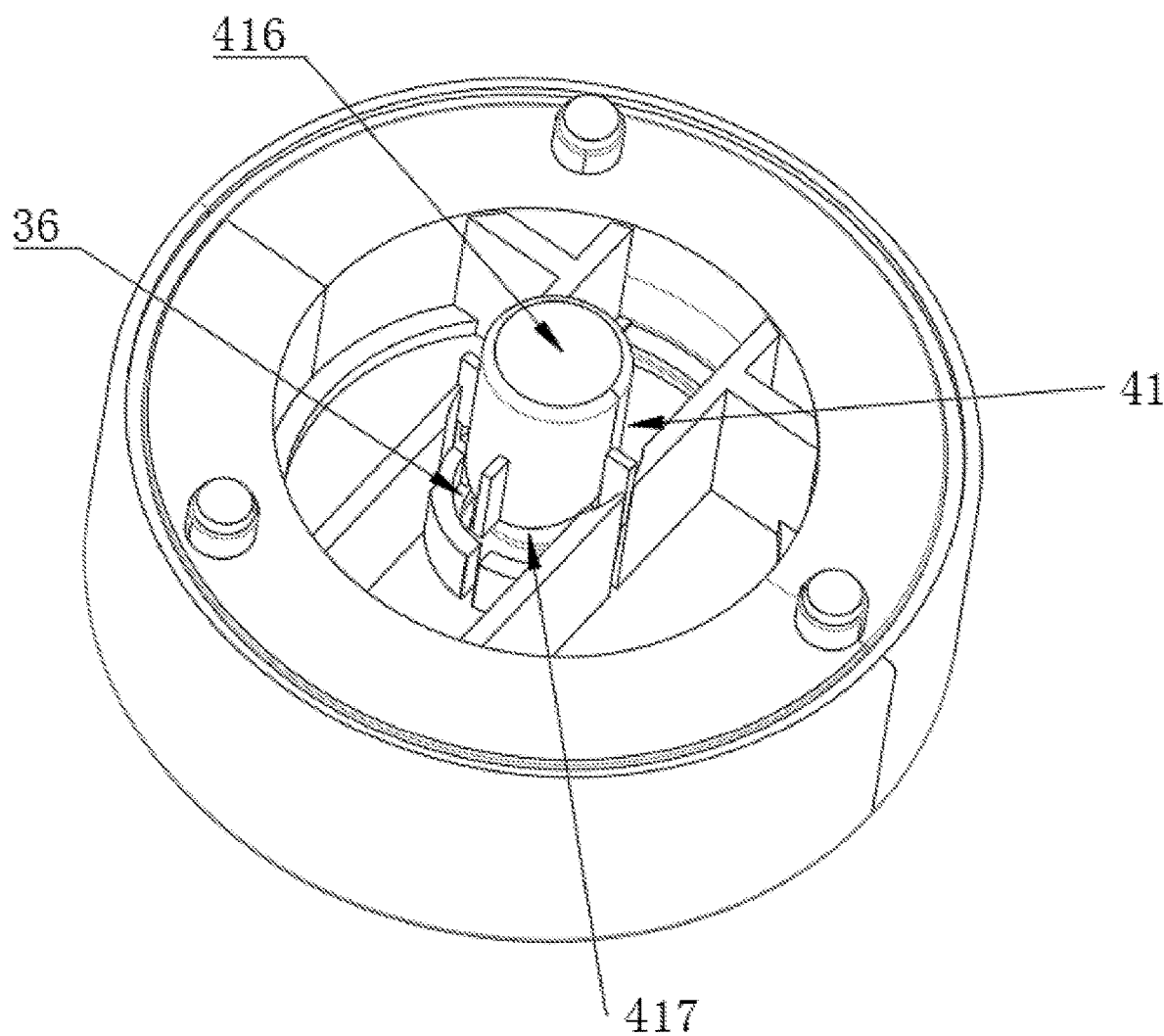
FIG. 12 is an assembled view of the top cover and the tea leaf chamber separation mechanism of the tea brewing device according to embodiment 2 of the present invention.
Figure 13:
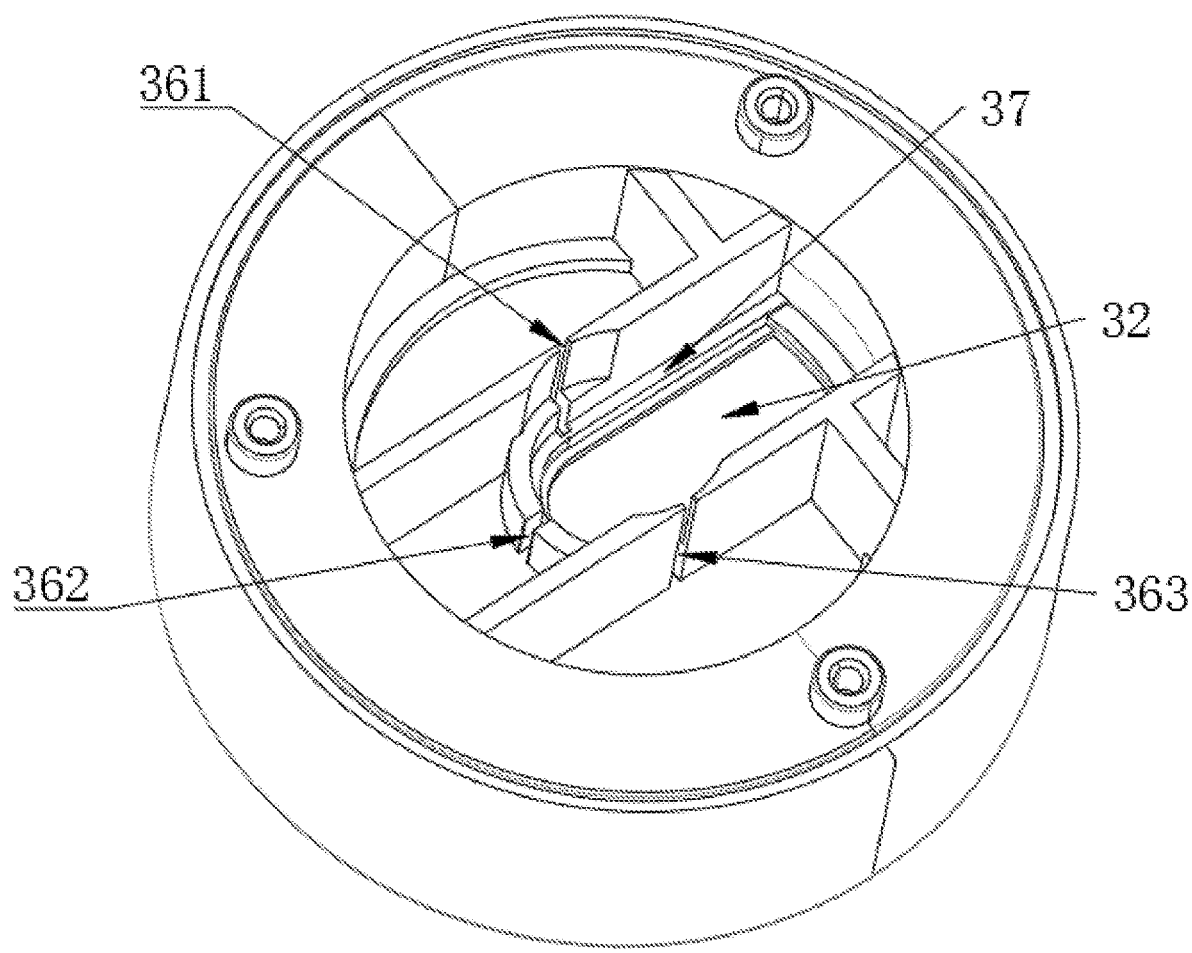
FIG. 13 is a structural view of the top cover of the tea brewing device according to embodiment 2 of the present invention.
Figure 14:
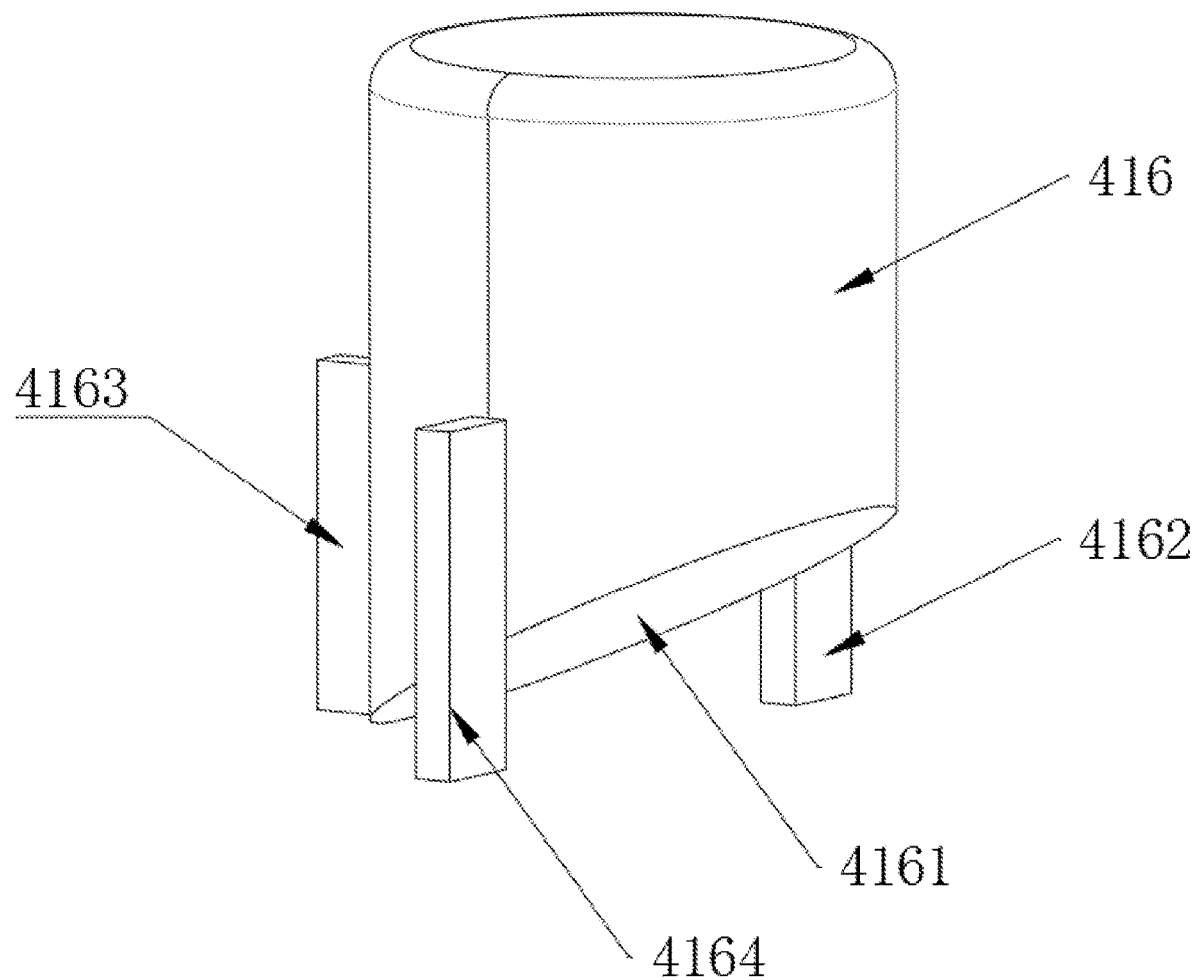
FIG. 14 is a structural view of the press portion of the tea brewing device according to embodiment 2 of the present invention.
Figure 15:
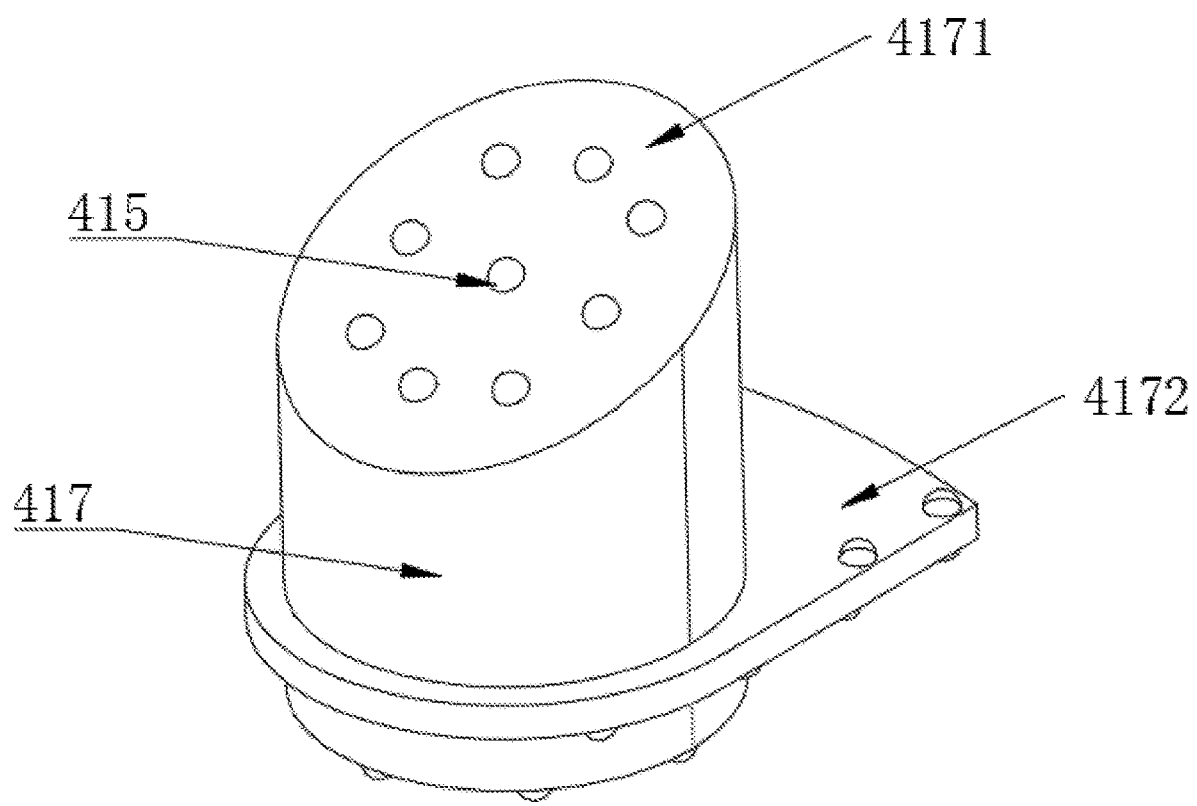
FIG. 15 is a structural view of the sliding portion of the tea brewing device according to embodiment 2 of the present invention.
Figure 16:
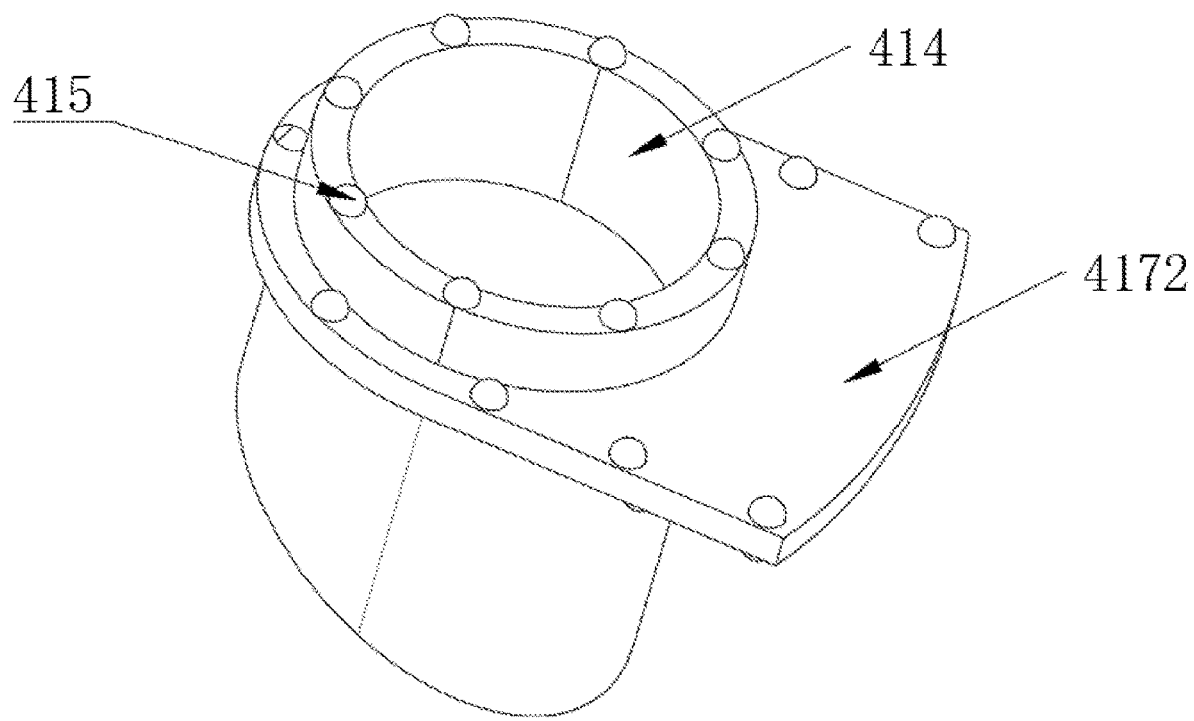
FIG. 16 is another structural view of the sliding portion of the tea brewing device according to embodiment 2 of the present invention, where a bottom side of the sliding portion is shown facing upwardly.

As shown in FIGS. 1-11, the present invention provides a tea brewing device, comprising a cup body 1, a tea leaf chamber 2, and a top cover 3 which is sealably connected with the cup body 1. During use, the tea leaf chamber 2 is disposed inside the cup body 1. A tea leaf chamber separation mechanism 4 is provided at a center of the top cover 3; the tea leaf chamber separation mechanism 4 comprises a sliding block 41 and a separation magnet 42; the separation magnet 42 is disposed at a bottom side of the sliding block 41 and protrudes out of the bottom side of the sliding block; a sliding groove 31 receiving the sliding block 41 and allowing the sliding block 41 to slide therein is provided radially on the top cover 3; a bottom side of the sliding groove 31 is recessed to define a separation groove 32 wherein the separation magnet 42 is slidable therein; one end of the separation groove 32 is provided with an arc shaped position limiting portion; the arc shaped position limiting portion is also positioned at a center of the bottom side of the sliding groove 31, so that the separation magnet 42 is positioned at the center of the sliding groove 31; through sliding, the sliding block 41 changes in position relative to the top cover 3; a center of an interior of the tea leaf chamber 2 is disposed with a sealed magnetic metal 21; the tea leaf chamber 2 is attracted to a center of a bottom side of the top cover 3 via magnetic attraction between the separation magnet 42 and the magnetic metal 21. When brewing tea, by driving the sliding block 41 to slide such that the separation magnet 42 is moved away from the magnetic metal 21, the magnetic attraction between the separation magnet 42 and the magnetic metal 21 will be reduced such that the magnetic attraction is weaker than a gravitational force of the tea leaf chamber 2. With reference to FIG. 2, the bottom side of the top cover 3 is provided with an annular flange 35 protruding out of the bottom side of the top cover, and an annular recessed portion 222 is provided on a tea leaf chamber upper cover 22 corresponding to the annular step, so that when the sliding block 41 is driven to slide, the tea leaf chamber 2 will not displace along with the sliding of the sliding block 41; as such, the tea leaf chamber 2 will drop down due to gravitational force and thus separate from the top cover 3. As the tea leaf chamber 2 drops down due to gravitational force to an inner bottom side of the cup body 1, tea brewing begins. To stop tea brewing, turn the cup body 1 up-side down so that the tea leaf chamber 2 will move towards the top cover 3 due to gravitational force, and thus the tea leaf chamber 2 will be attracted to the bottom side of the top cover 3 due to magnetic attraction between the separation magnet 42 and the magnetic metal 21, turn the cup body 1 back to the original upright position, the tea leaf chamber 2 is still attracted to the bottom side of the top cover 3, thereby separating the tea leaf chamber 2 from the brewed tea.

It should be understood that, the sliding groove 31 that receives the sliding block 41 to slide therein can also be disposed circumferentially on the top cover 3. In such embodiment, the sliding groove 31 as well as the separation groove 32 will have an arc shape. By driving the sliding block 41 to slide within the sliding groove 31, the separation magnet 42 is also driven to move within the separation groove 32, so that the separation magnet 42, physically separated from the magnetic metal 21 by the bottom side of the top cover, will be driven away from the magnetic metal 21; as the separation magnet 42 is driven away from the magnetic metal 21, magnetic attraction between the separation magnet 42 and the magnetic metal 21 will be gradually weakened. As the magnetic attraction is weaker than the gravitational force of the tea leaf chamber 2, the tea leaf chamber 2 will be separated from the top cover 3 and drops into the cup body 1 to start tea brewing.

Specifically, in the present embodiment, an upper side surface of the sliding block 41 is provided with a push button 411; a periphery of the upper side surface of the sliding block 41 is defined as a first sliding periphery 412 slidably in contact with top end surfaces of the sliding groove 31; a periphery of the bottom side of the sliding block 41 is defined as a second sliding periphery 413 slidably in contact with the bottom side of the sliding groove 31; one end of the bottom side of the sliding block 41 is provided with a stepped hole 414 wherein the separation magnet 42 is mounted; a center point of the stepped hole 414 coincides with a center point of the top cover 3. It should be understood that, the separation magnet 42 is mounted into the stepped hole 414 so that the separation magnet 42 is positioned at the center point of the top cover to ensure proper attraction between the tea leaf chamber 2 an the top cover 3.

Specifically, in the present embodiment, the tea leaf chamber separation mechanism 4 also comprises a spring 43 and a tea leaf chamber separation mechanism upper cover 44; one end of the spring 43 is connected to a front end of the sliding block 41 along a sliding direction of the sliding block 41, and another end of the spring 43 is connected to one end of the sliding groove 31; also, the spring 43 is positioned above the separation groove 32; a annular opening 441 is provided at a middle part of the tea leaf chamber separation mechanism upper cover 44 of the tea leaf chamber separation mechanism 4 extending towards a periphery of the tea leaf chamber separation mechanism upper cover 44; an upper end of the push button 411 passes through the annular opening 441; through holes 442 are provided around a peripheral area of a top surface of the tea leaf chamber separation mechanism upper cover 44; the tea leaf chamber separation mechanism upper cover 44 fixedly covers the top cover 3. It should be understood that, when the push button 411 is driven, due to the limitation of the annular opening 441, radial driven force of the push button 411 will drive the sliding block 41 to slide; as the sliding block 41 slides, the spring 43 is compressed to store the resilient force to restore the sliding block 41; when the tea leaf chamber 2 is separated from the top cover 3, the resilient force of the spring 43 is released to decompress the spring 43 and restore the sliding block 41 to slide back to its original position.

Specifically, in the present embodiment, fixation holes 33 are provided around a peripheral area of a top surface of the top cover 3; the fixation holes 33 correspond to the through holes 442 such that each fixation hole 33 and a corresponding through hole 442 is passed through by a screw to fix the tea leaf chamber separation mechanism upper cover 44 onto the top cover 3, and to slidably assemble the sliding block 41 to the top cover 3.

Specifically, in the present embodiment, the peripheral area of the top surface of the tea leaf chamber separation mechanism upper cover 44 where the through holes 442 are positioned is also recessed to form an annular groove 443; a plastic ring 444 is disposed in the annular groove 443 to seal the screws. A bottom side of the first sliding periphery 412 and a bottom side of the second sliding periphery 413 are each provided with semi-spherical protrusions 415. It should be understood that, the plastic ring 444 disposed in the annular groove 443 can on one hand seal the screws, and on the other hand conceal the screws from being visible from outside so as to provide a better outer appearance. The semi-spherical protrusions 415 on the bottom side of the first sliding periphery 412 and the bottom side of the second sliding periphery 413 provide contact points between the sliding block 41 and the sliding groove 31 to enable the sliding block 41 to slide with reduced friction, thereby enhancing the performance of the tea brewing device of the present invention.

Specifically, in the present embodiment, the tea leaf chamber 2 comprises the tea leaf chamber upper cover 22 and a chamber body 23. The tea leaf chamber upper cover 22 covers the chamber body 23. A cavity 231 that holds tea leaves and a mounting hole 221 that mounts the magnetic metal 21 are provided inside the chamber body 23. It should be understood that, in terms of production technique, the mounting hole 221 sleeves the magnetic metal 21 so that the magnetic metal 21 will not expose, and during production, the magnetic metal 21 is sealed by silicon plastic seal. The mounting hole 221 is positioned at a center of the cavity 231. The tea leaf chamber upper cover 22 and the chamber body 23 are both provided with meshes to ensure sufficient contact between water and the tea leaves during tea brewing.

Specifically, in the present embodiment, the magnetic metal 21 is an iron, and the separation magnet 42 is a neodymium magnet. It should be understood that, the magnetic metal 21 should not be limited to iron, but can be any metallic substances with magnetic properties, such as cobalt, nickel and alloy thereof. The separation magnet 42 being a neodymium magnet ensures magnetic strength, such that when the separation magnet 42 is placed within a certain distance from the magnetic metal 21, magnetic attraction between the separation magnet 42 and the magnetic metal 21 is greater than the gravitational force of the tea chamber 2.

Specifically, in the present embodiment, the top cover 3 is threadedly connected to the cup body 1. The bottom side of the top cover 3 is provided with a seal ring 34 to achieve sealing between the top cover 3 and the cup body 1. It should be understood that, by providing the seal ring 34 at the connecting area between the top cover 3 and the cup body 1, the overall sealing effect of the tea brewing device of the present invention is guaranteed, so that even if the cup body 1 is turned up-side down, the tea inside will not leak out. The present invention is thus convenient and reliable to use.

Specifically, a bottom part of the cup body 1 is sleeved with a silicon sleeve 11; an annular gas discharging port 111 is provided on a side wall of the silicon sleeve 11. It should be understood that, patterns or other design features can be additionally provided on the silicon sleeve 11 to provide a more beautiful outer appearance of the tea brewing device. The annular gas discharging port 111 is used for discharging gas while the silicon sleeve 11 sleeves onto the cup body 1, so that the silicon sleeve 11 can smoothly sleeve onto the cup body 1.

Embodiment 2

As shown in FIG. 12 to FIG. 16, embodiment 2 modifies the structures of the top cover and the sliding block on the basis of embodiment 1. The differences compared with embodiment 1 are detailed as follows:

Specifically, in the present embodiment, the sliding block is an assembly of more than one component. Specifically, the sliding block 41 is divided by an upward slanted cut in a middle part of the sliding block 41 such that the sliding block 41 is divided into a press portion 416 and a sliding portion 417; the press portion 416 and the sliding portion 417 slide mutually with respect to each other via a first sliding slanted surface 4161 of the press portion 416 along the slanted cut and a second sliding slanted surface 4171 of the sliding portion 417 along the slanted cut. The separation magnet is disposed on a bottom side of the sliding portion 417 and protrudes out of the bottom side of the sliding portion 417. The top cover is axially provided with a guiding groove 36 that receives the press portion 416 and inside which the press portion 416 can move vertically by pressing the press portion 416. A bottom part of the guiding groove 36 is recessed downwardly away from a center point of the top cover to sequentially define a sliding trough 37 that allows the sliding portion 417 to slide therein and the separation groove 32 that allows the separation magnet 42 to slide therein. One end of the separation groove 32 is positioned at a center of a bottom of the guiding groove 36.

Specifically, in the present embodiment, the guiding groove 36 has a semi-circular shape; the guiding groove 36 is opened with a first slot 361, a second slot 362 and a third slot 363 equally spaced along the semi-circular shape of the guiding groove 36.

Specifically, in the present embodiment, a side surface of a lower part of the press portion 416 is provided with a first guiding piece 4162, a second guiding piece 4163 and a third guiding piece 4164 that are capable of slidably engaging with the first slot 361, the second slot 362 and the third slot 363 respectively. It should be understood that, the press portion 416 moves vertically via the first guiding piece 4162, the second guiding piece 4163 and the third guiding piece 4164 sliding vertically inside the first slot 361, the second slot 362 and the third slot 363 respectively; vertical movement of the press portion 416 is translated into the radial movement of the sliding portion 417 through mutual sliding movement between the first sliding slanted surface of the press portion 416 along the slanted cut and the second sliding slanted surface 4171 of the sliding portion 417 along the slanted cut, thereby achieving sliding of the separation magnet 42 in the separation groove 32, so that the separation magnet 42, physically separated from the magnetic metal 21 by the bottom side of the top cover, will be driven away from the magnetic metal 21; as the separation magnet 42 is driven away from the magnetic metal 21, magnetic attraction between the separation magnet 42 and the magnetic metal 21 will be gradually weakened. As the magnetic attraction is weaker than the gravitational force of the tea leaf chamber 2, the tea leaf chamber 2 will be separated from the top cover 3 and drops into the cup body 1 to start tea brewing.

Specifically, in the present embodiment, a lower part of the sliding portion 417 is also provided with a third sliding periphery 4172 that is in slidable contact with the sliding trough 37; a bottom side of the sliding portion 417 is provided with the stepped hole 414 wherein the separation magnet 42 is mounted; the center point of the stepped hole 414 coincides with the center point of the top cover 3.

Specifically, in the present embodiment, a bottom side of the third sliding periphery 4172 and a bottom end surface of the stepped hole 414 are each provided with multiple semi-spherical protrusions 415. It should be understood that, the semi-spherical protrusions 415 on the bottom side of the third sliding periphery 4172 and on the bottom end surface of the stepped hole 414 provide contact points between the sliding portion 417 and the sliding trough 37 to enable the sliding portion 417 to slide with reduced friction, thereby enhancing the performance of the tea brewing device of the present invention.

Specifically, in the present embodiment, semi-spherical protrusions 415 are also provided on the second sliding slanted surface 4171 of the sliding portion 417 along the slanted cut; one end of the spring 43 is connected to a front end of the sliding portion 417 along a sliding direction of the sliding portion 417; and another end of the spring 43 is connected to one end of the sliding trough 37. It should be understood that, the provision of the semi-spherical protrusions 415 on the second sliding slanted surface 4171 of the sliding portion 417 along the slanted cut provide contact points between the sliding portion 417 and the press portion 416 instead of direct surface contact between the sliding portion 417 and the press portion 416 when the sliding portion 417 slides with respect to the press portion 416, so that friction is reduced when the sliding portion 417 slides with respect to the press portion 416, thereby enhancing the performance of the present invention. The press portion 416 translates the vertical movement thereof to radial movement of the sliding portion 417 such that the sliding portion 417 is driven to slide; as the sliding portion 417 slides, the spring 43 is compressed to store the resilient force to restore the sliding portion 417; when the tea leaf chamber 2 is separated from the top cover 3, the resilient force of the spring 43 is released to decompress the spring 43 and restore the sliding portion 417 to slide back to its original position which in turns drives the press portion 416 to move upwardly to restore to its original position.

Use of the Present Invention

To brew tea, open the tea leaf chamber upper cover 22 of the tea leaf chamber 2, pour tea leaves into the cavity 231, close the tea leaf chamber upper cover 22, drop the tea leaf chamber 2 into the cup body 1, pour hot water inside the cup body, seal the cup body 1 with the top cover 3, and start brewing tea.

When the tea is brewed to have the strength preferred by the user, it is no longer required to immerse the tea leaves into the water. Therefore, turn the cup body 1 up-side down (that is, the top cover 3 faces downwardly), so that the tea leaf chamber 2 moves towards the top cover 3 due to gravitational force, and thus the tea leaf chamber 2 will be attracted to the bottom side of the top cover 3 due to magnetic attraction between the separation magnet 42 and the magnetic metal 21, turn the cup body 1 back to the original upright position, the tea leaf chamber 2 is still attracted to the bottom side of the top cover 3, thereby separating the tea leaf chamber 2 from the brewed tea. Hence, tea brewing is stopped.

When tea brewing is again required, drive the push button 411 towards a radial direction of the tea brewing device so that the sliding block 41 slides, or push the press portion 416 of the sliding block 41 to act on the sliding portion 417 so that the sliding portion 417 slides, then the spring 43 will be compressed; as the sliding block 41 or the sliding portion 417 slides, the separation magnet 42 is gradually driven away from the magnetic metal 21 so that the magnetic force between the separation magnet 42 and the magnetic metal 21 is gradually weakened. When the magnetic force between the separation magnet 42 and the magnetic metal 21 is weaker than the gravitational force of the tea leaf chamber 2, the tea leaf chamber 2 will drop to the inner bottom of the cup body 1 due to gravitational force, thereby resuming tea brewing. As the driving force upon the push button 411 or the pressing force upon the press portion 416 is released, resilience of the spring 43 will cause the spring 43 to decompress and thus restore the sliding block 41 or the sliding portion 417 to a position that allows the separation magnet 42 to be capable of attracting the magnetic metal 21 (the original position), so that when next time tea brewing is again not required, magnetic attraction is enabled between the separation magnet 42 and the magnetic metal 21 so that the tea leaf chamber 2 is attracted to the bottom side of the top cover 3. Thus, the present invention achieves the function of adjusting the strength of tea.

According to the present invention, the top cover 3 can hold the tea leaf chamber 2 by magnetic attraction or release the tea leaf chamber 2 via the tea leaf chamber separation mechanism 4 disposed on the top cover 3 by making use of magnetic mechanism according to which the magnetic metal 21 or an iron is magnetically attracted by a magnet. When it is required to brew tea, the separation magnet 42 is driven away from the magnetic metal 21 by driving the sliding block 41 or pressing the press portion 416. When the magnetic force between the separation magnet 42 and the magnetic metal 21 is reduced to be weaker than the gravitational force of the tea leaf chamber 2, the tea leaf chamber 2 will drop to the inner bottom of the cup body 1 due to gravitational force, and start tea brewing. When tea brewing is not required, turn the cup body 1 up-side down such that the tea leaf chamber 2 will move towards the top cover due to gravitational force, and thus the tea leaf chamber 2 will be attracted to the bottom side of the top cover 3 due to magnetic attraction between the separation magnet 42 and the magnetic metal 21, then turn the cup body 1 back to the original upright position, the tea leaf chamber 2 is still attracted to the bottom side of the top cover 3, thereby separating the tea leaf chamber 2 from the brewed tea. As such, the present invention achieves the function of adjusting the strength of tea. The present invention is simple in structure, convenient to use, stable and reliable, and can adjust the strength of tea. Hence, the present invention overcomes the technical problem of adjusting the strength of tea as in the prior art. The present invention can also be widely applied to other devices that also require adjustment of liquid concentration. Accordingly, the present invention has a good marketing value.

The technical solutions provided by the present invention are described above in detail. Specific embodiments are described to illustrate the inventive concept and the ways of implementing the present invention. However, it should be understood that the above described embodiments are only intended to be illustrative to facilitate understanding of the inventive concept of the present invention. A person skilled in the art may make changes to the embodiments or the scope of application in accordance with the disclosure given herein. In conclusion, the description given above should not limit the present invention.

What is claimed is:

1. A tea brewing device, comprising a cup body, a tea leaf chamber, and a top cover which is sealably connected with the cup body; the tea leaf chamber is disposed inside the cup body during use; wherein, a tea leaf chamber separation mechanism is provided at a center of the top cover; the tea leaf chamber separation mechanism comprises a sliding block and a separation magnet; the separation magnet is disposed at a bottom side of the sliding block and protrudes out of the bottom side of the sliding block; sliding of the sliding block changes a position of the sliding block relative to the top cover; a center of an interior of the tea leaf chamber is disposed with a sealed magnetic metal; the tea leaf chamber is attracted to a center of a bottom side of the top cover via magnetic attraction between the separation magnet and the magnetic metal; to brew tea, the sliding block is driven to slide such that the separation magnet is moved away from the magnetic metal, so that the magnetic attraction between the separation magnet and the magnetic metal is reduced such that the magnetic attraction is weaker than a gravitational force of the tea leaf chamber, resulting in the tea leaf chamber dropping down to an inner bottom side of the cup body due to the gravitational force and thus separated from the top cover, thereby beginning tea brewing; to stop tea brewing, the cup body is turned up-side down so that the tea leaf chamber moves towards the top cover due to the gravitational force, and thus the tea leaf chamber is attracted to the bottom side of the top cover due to magnetic attraction between the separation magnet and the magnetic metal; when the cup body is again turned back to an original upright position, the tea leaf chamber is attracted to the bottom side of the top cover, thereby separating the tea leaf chamber from the brewed tea.

2. The tea brewing device of claim 1, wherein the sliding block is an integral piece of component; a sliding groove receiving the sliding block and allowing the sliding block to slide therein is provided radially on the top cover; a bottom side of the sliding groove is recessed to define a separation groove where the separation magnet is slidable therein; one end of the separation groove is positioned at a center of the bottom side of the sliding groove.

3. The tea brewing device of claim 1, wherein the sliding block is an assembly of more than one component; wherein the sliding block is divided by an upward slanted cut in a middle part of the sliding block such that the sliding block is divided into a press portion and a sliding portion; the press portion and the sliding portion slide mutually with respect to each other via a first sliding slanted surface of the press portion along the slanted cut and a second sliding slanted surface of the sliding portion along the slanted cut; the separation magnet is disposed on a bottom side of the sliding portion and protrudes out of the bottom side of the sliding portion; the top cover is axially provided with a guiding groove that receives the press portion and inside which the press portion is capable of moving vertically by pressing the press portion; a bottom part of the guiding groove is recessed downwardly away from a center point of the top cover to sequentially define a sliding trough that allows the sliding portion to slide therein and a separation groove that allows the separation magnet to slide therein; one end of the separation groove is positioned at a center of a bottom of the guiding groove.

4. The tea brewing device of claim 2, wherein an upper side surface of the sliding block is provided with a push button; a periphery of the upper side surface of the sliding block is defined as a first sliding periphery slidably in contact with top end surfaces of the sliding groove; a periphery of the bottom side of the sliding block is defined as a second sliding periphery slidably in contact with the bottom side of the sliding groove; one end of the bottom side of the sliding block is provided with a stepped hole in which the separation magnet is mounted; a center point of the stepped hole coincides with a center point of the top cover.

5. The tea brewing device of claim 3, wherein the guiding groove has a semi-circular shape; the guiding groove is opened with a first slot, a second slot and a third slot equally spaced along the semi-circular shape of the guiding groove.

6. The tea brewing device of claim 4, wherein the tea leaf chamber separation mechanism also comprises a spring and a tea leaf chamber separation mechanism upper cover; one end of the spring is connected to a front end of the sliding block along a sliding direction of the sliding block, and another end of the spring is connected to one end of the sliding groove; also, the spring is positioned above the separation groove; an annular opening is provided at a middle part of the tea leaf chamber separation mechanism upper cover of the tea leaf chamber separation mechanism extending towards a periphery of the tea leaf chamber separation mechanism upper cover; an upper end of the push button passes through the annular opening; through holes are provided around a peripheral area of a top surface of the tea leaf chamber separation mechanism upper cover; the tea leaf chamber separation mechanism upper cover fixedly covers the top cover.

7. The tea brewing device of claim 5, wherein a side surface of a lower part of the press portion is provided with a first guiding piece, a second guiding piece and a third guiding piece that are capable of slidably engaging with the first slot, the second slot and the third slot respectively.

8. The tea brewing device of claim 6, wherein fixation holes are provided around a peripheral area of a top surface of the top cover; the fixation holes correspond to the through holes such that each fixation hole and a corresponding through hole is adapted to be passed through by a screw to fix the tea leaf chamber separation mechanism upper cover onto the top cover, and to slidably assemble the sliding block to the top cover.

9. The tea brewing device of claim 7, wherein a lower part of the sliding portion is also provided with a third sliding periphery that is in slidable contact with the sliding trough; a bottom side of the sliding portion is provided with a stepped hole in which the separation magnet is mounted; a center point of the stepped hole coincides with a center point of the top cover.

10. The tea brewing device of claim 8, wherein the peripheral area of the top surface of the tea leaf chamber separation mechanism upper cover where the through holes are positioned is also recessed to form an annular groove; a plastic ring adapted to seal the screws is disposed in the annular groove; a bottom side of the first sliding periphery and a bottom side of the second sliding periphery are each provided with semi-spherical protrusions.

11. The tea brewing device of claim 9, wherein a bottom side of the third sliding periphery and a bottom end surface of the stepped hole are each provided with multiple semi-spherical protrusions.

12. The tea brewing device of claim 11, wherein the second sliding slanted surface of the sliding portion along the slanted cut is also provided with semi-spherical protrusions thereon; one end of the spring is connected to a front end of the sliding portion along a sliding direction of the sliding portion; and another end of the spring is connected to one end of the sliding trough.

13. The tea brewing device of claim 1, wherein the tea leaf chamber comprises a tea leaf chamber upper cover and a chamber body; the tea leaf chamber upper cover covers the chamber body; a cavity that holds tea leaves and a mounting hole that mounts the magnetic metal are provided inside the chamber body; the mounting hole is positioned at a center of the cavity; the tea leaf chamber upper cover and the chamber body are both provided with meshes.

14. The tea brewing device of claim 1, wherein the magnetic metal is an iron, and the separation magnet is a neodymium magnet.

15. The tea brewing device of claim 1, wherein the top cover is threadedly connected to the cup body; the bottom side of the top cover is provided with a seal ring to achieve sealing between the top cover and the cup body.

\* \* \* \* \*